No. 682,652. Patented Sept. 17, 1901.
W. H. UNDERWOOD.
DEVICE FOR RELEASING ANIMALS FROM STABLES.
(Application filed May 15, 1901.)
(No Model.)
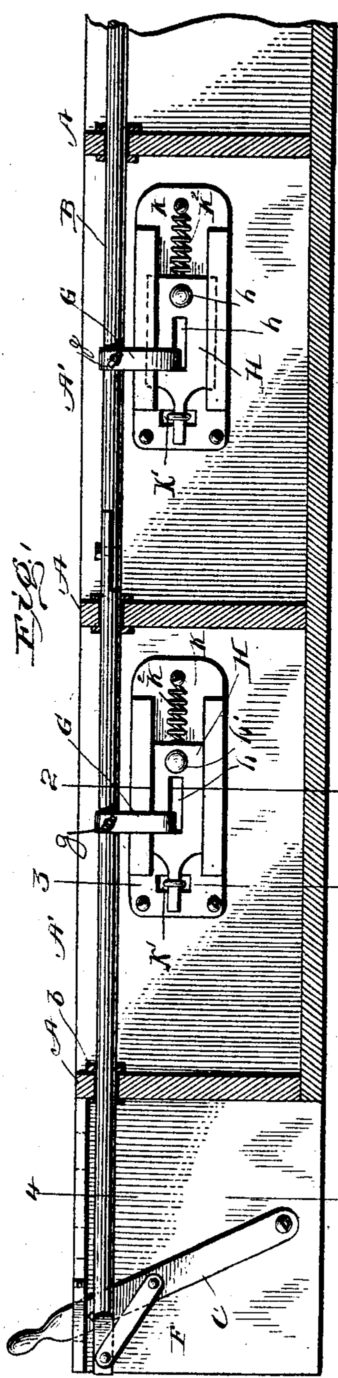
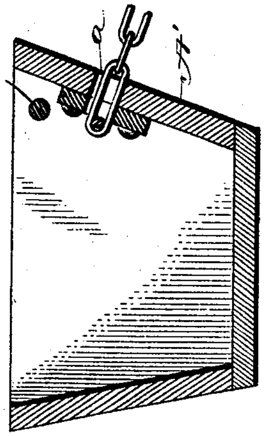
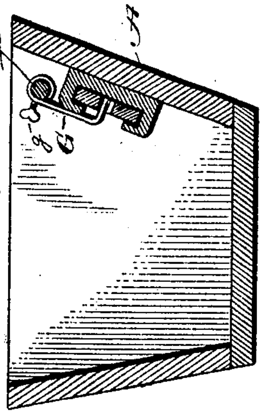
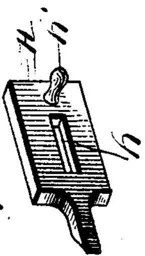
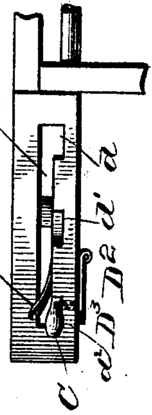
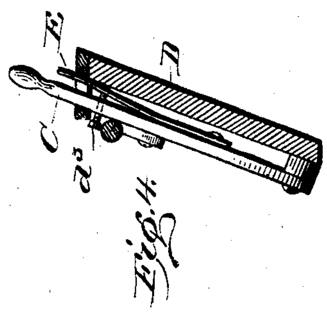
Witnesses:
J. M. Fowler Jr.
Leonard Aimken[?]
Inventor
William H Underwood
by
J. F. Beale. Atty
THE NORRIS PETERS CO., PHOTO-LITHO., WASHINGTON, D. C.

United States Patent Office.

WILLIAM H. UNDERWOOD, OF PARKSBURG, PENNSYLVANIA.

DEVICE FOR RELEASING ANIMALS FROM STABLES.

SPECIFICATION forming part of Letters Patent No. 682,652, dated September 17, 1901.

Application filed May 15, 1901. Serial No. 60,257. (No model.)

*To all whom it may concern:*

Be it known that I, WILLIAM H. UNDERWOOD, a citizen of the United States, residing at Parksburg, in the county of Chester and State of Pennsylvania, have invented certain new and useful Improvements in Devices for Releasing Animals from Stables; and I do hereby declare the following to be a full, clear, and exact description of the invention, such as will enable others skilled in the art to which it appertains to make and use the same.

My invention relates to devices for releasing the halters of all the animals in a stable at the same time.

The object of my invention is to provide a device of this character whereby the animals may not only all be released at the same time, but means is also provided after the animals are hitched to their stalls for locking all the halter-rings by one operation; also, to provide a device having a spring-actuated hitching-bolt which will allow any one of said bolts to be operated independently of the others; also, to provide a device adapted to be affixed to the interior of trough removed from possible contact with the fore legs of the animal and one which when the halter-ring is released will allow the halter to drop by gravity clear of the trough.

It is also my object to provide an inexpensive device which can readily be affixed to a trough or troughs without necessitating alterations or changes in their structure, the several parts of the device to be detachably connected to the troughs and to each other for purposes of repair and renewal.

In the accompanying drawings, forming a part of this specification, Figure 1 is a longitudinal section of a trough divided into partitions for each stall having my invention applied. Fig. 2 is a cross-section on line 2 2 of Fig. 1. Fig. 3 is a cross-section on line 3 3 of Fig. 1. Fig. 4 is a cross-section on line 4 4 of Fig. 1. Fig. 5 is a detail top plan of the frame D, showing the slot therein and the operating-lever and its spring. Fig. 6 is a detailed perspective of the hitching-bolt. Fig. 7 is a detail section through a portion of the frame D and operating-lever, showing the hinged arm and staple for locking the lever.

Referring more particularly to the drawings, A A denote trough-partitions dividing a trough into compartments, one for each stall. Two of these compartments are shown; but their number may be increased to meet the requirements of the stable. A′ denotes the front side of the trough, which is inclined outwardly, as is usual in the construction of troughs, provided with a small vertical slot *a* for the passage of the halter-ring. B denotes a rod running lengthwise of the trough and loosely mounted in perforations in the partitions to allow of its longitudinal movement. *b* denotes wear-plates for said rod fixed to said partitions. C denotes an operating-lever for said rod, pivoted to a frame D, which is arranged in alinement with the front side of said trough and extends to a point outside of the stable or barn. The upper part of said frame is provided with a slot D′, having upon one side three notches *d*, *d′*, and $d^2$ adapted to receive said lever. $D^2$ denotes a staple at the end of a short arm $D^3$, hinged to said frame. Said staple passes through a perforation in the frame over the notch $d^2$ and is adapted to pass through a perforation in the lever when it rests in said notch, projecting through the lever sufficiently to admit the passage of a padlock, as shown in Fig. 7. E denotes a flat steel spring, rigidly fastened at its lower end to said lever and extending lengthwise thereof. The free end of said spring passes through the slot D′ and bears upon the side of said slot opposite said notches, forcing the lever into said notches as it ranges opposite the same. $d^3$ denotes a thumb-screw passing through said lever and bearing against said spring, the purpose of which is to regulate the pressure of the spring. F denotes a link pivoted to said lever and to the end of the rod B to impart a horizontal or longitudinal movement to the same. G G denote fingers fastened to said rod by thumb-screws *g*. Said fingers are arc-shaped, their lower or free ends projecting downwardly and playing in longitudinal slots in the hitching-bolts, as hereinafter mentioned.

H denotes the hitching-bolts, having longitudinal slots *h* and are provided at their rear ends with knobs *h′*. The free ends of these bolts are beveled, as shown in Fig. 6, the purpose of which is that when in certain positions said bolts will act as spring-latches, to admit and fasten the halter-rings, as hereinafter mentioned.

K denotes plates, having grooved channels therein adapted to receive and allow the free longitudinal play of the bolts H. K' denotes openings in said plates, which are adapted to register with the slots $a$ in the trough for the passage of the halter-ring. $K^2$ denotes coiled springs secured to the rear ends of said plates. The free ends of these springs bear against the rear ends of bolts H and press the bolts forward, bringing their beveled ends opposite to and across the openings K'. This occurs when the lever is held in notch $d'$. In this position the hitching-bolts are self-locking, for when a halter-ring is pressed against the beveled end of said bolt it forces the bolt back against the spring, and as the ring enters the opening the spring throws the bolt forward and locks the ring to the trough.

The device is operated as follows: When it is desired to lock the halter-rings to the troughs, the lever is moved until it ranges opposite the notch $d^2$, when the spring E will force the lever into said notch. In this position the operating-rod has moved the free ends of the fingers forward, causing them to bear against the forward ends of the slots in the hitching-bolts and throwing them forward across the openings K', as shown in Fig. 1, and through the halter-rings. In this position the bolts are thrown the maximum distance and are locked in such position against possible interference of the animals by the spring E forcing the operating-lever into the notch $d^2$. In order to secure the halter-rings in this locked position against possible interference of any person, I provide the hinged staple before described secured to the frame D. This means for locking the halter-rings to the hitching-bolts is especially adapted for open mangers, and prevents the release of any one or more of the animals by meddlesome or evilly-disposed persons. When the lever is held in notch $d'$, the fingers are confined in their forward movements, and while they still may throw the hitching-bolts across the opening K' they are restricted from throwing the bolts forward the maximum distance. In this position the hitching-bolts can each be operated independently of the lever and of each other, the knobs $h'$ serving as handles. To release all the halter-rings at once from the hitching-bolts, the lever is thrown into notch $d$.

It will be seen that by my construction the hitching-bolts may be adjusted by the operating-lever to serve as spring-latches for engaging and holding the halter-rings, or when thrown the maximum distance they serve as bolts for locking the rings to the troughs.

Having shown and described my invention, what I claim, and desire to secure by Letters Patent, is—

In a halter-releasing device a supporting-frame having openings, movable spring-pressed bolts thereon each having a beveled end, and arranged to move across the opening, a sliding bar, a connection between the bolts and bar for providing a limited relative longitudinal movement, a lever attached to the sliding bar, and a plate having three notches so arranged that when the lever is in one of the end notches the bolt will be locked, when in the other end will be held open, and when in the middle notch will act as a spring-latch, as described.

In testimony whereof I affix my signature in presence of two witnesses.

WILLIAM H. UNDERWOOD.

Witnesses:
DAVID B. CLARK,
JAS. S. COCHRAN.